United States Patent
Wang et al.

(10) Patent No.: US 9,154,858 B2
(45) Date of Patent: Oct. 6, 2015

(54) PROBABILITY-BASED REGENERATOR SITE ANALYSIS

(75) Inventors: Xi Wang, Murphy, TX (US); Qiong Zhang, Plano, TX (US); Paparao Palacharla, Richardson, TX (US); Motoyoshi Sekiya, Richardson, TX (US)

(73) Assignee: FUJITSU LIMITED, Kawasaki (JP)

(*) Notice: Subject to any disclaimer, the term of this patent is extended or adjusted under 35 U.S.C. 154(b) by 540 days.

(21) Appl. No.: 13/585,663

(22) Filed: Aug. 14, 2012

(65) Prior Publication Data
US 2014/0052419 A1 Feb. 20, 2014

(51) Int. Cl.
*G06G 7/48* (2006.01)
*H04Q 11/00* (2006.01)
*H04J 14/00* (2006.01)
*H04L 12/24* (2006.01)

(52) U.S. Cl.
CPC ............... *H04Q 11/00* (2013.01); *H04J 14/00* (2013.01); *H04L 41/142* (2013.01); *H04L 41/145* (2013.01); *H04Q 2213/13164* (2013.01); *H04Q 2213/13335* (2013.01)

(58) Field of Classification Search
CPC .................................................. H04L 41/145
USPC ............................................................ 703/6
See application file for complete search history.

(56) References Cited

PUBLICATIONS

Inkret et al.: Advanced Infrastructure for Photonic Networks; Extended Final Report of Cost Action 266; Published by: Faculty of Electrical Engineering and Computing, University of Zagreb; 2003; 254 pages.*
Netsmart2000 Fujitsu sales brochure; 2009; 4 pages.*
Gao et al: Survivable Impairment-Aware Traffic Grooming and Regenerator Placement with Shared Connection-Level Protection; ICTON 2011 (Jun. 2011); pp. 1-4.*
Netsmart 2000 Design and Planning Tool, Fujitsu Network Communications Inc., 2012 <www.fujitsu.com/downloads/TEL/fnc/datasheets/netsmart2000.pdf>, 11 pages.

* cited by examiner

*Primary Examiner* — Hugh Jones
(74) *Attorney, Agent, or Firm* — Maschoff Brennan

(57) ABSTRACT

An optical network analysis tool includes a computer-readable storage medium having computer-readable instructions stored thereon. The computer-readable instructions are executable by a computing device to perform operations. The operations include generating a simulated network that models an optical network. The simulated network includes regenerator candidate sites. The operations may also include conducting an analysis of the optical network. The analysis includes introducing a multiple signals transmitted between source/destination pairs and recording a number of times each of the regenerator candidate sites are selected as a regenerator site while applying each of a set of data traffic conditions in the simulated network. The operations may also include statistically analyzing the number of times each of the regenerator candidate sites is selected to generate statistically analyzed information and presenting the statistically analyzed information.

18 Claims, 8 Drawing Sheets

| Candidate Site | 302 | SDPE Value 402 | SDPE Ranking 404 |
|---|---|---|---|
| First Candidate Site | 302A | First SDPE 402A | First 404A |
| Second Candidate Site | 302B | Second SDPE 402B | Second 404B |
| ⋮ | | ⋮ | ⋮ |
| Nth Candidate Site | 302C | Nth SDPE 402C | Nth 404C |

PROBABILITY-BASED REGENERATOR SITE ANALYSIS

FIELD

The embodiments discussed herein are related to regenerator site analysis in optical networks.

BACKGROUND

Optical networks may be used to communicate information as optical signals. In some optical networks, information is communicated through a network of nodes operably coupled by optical fibers. In some optical networks, the distance between nodes and/or the characteristics of the optical fibers may result in attenuation or distortion of the optical signals. The attenuation or distortion of the optical signals may result in data loss, for example. Regenerators may be included at one or more of the nodes to restore the optical signals and/or compensate for the attenuation or the distortion.

Regenerators may not be installed at every node in the optical network due to the expense and inefficiencies incurred. Thus, in some optical networks regenerator sites are determined at certain nodes. Previously, the determination of regenerator sites was commonly based on pre-planned static demands of optical networks. As technology in optical networks progresses, some optical networks have become dynamic optical networks such as reconfigurable optical networks. The dynamic optical networks may include distributed controls and may additionally include the capability to respond to variable data traffic conditions in the optical network. In dynamic optical networks, it may be difficult to select regenerator sites.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, an optical network analysis tool includes a computer-readable storage medium having computer-readable instructions stored thereon. The computer-readable instructions are executable by a computing device to perform operations. The operations include generating a simulated network that models an optical network. The simulated network includes regenerator candidate sites. The operations may also include conducting an analysis of the optical network. The analysis includes introducing multiple signals transmitted between source/destination pairs and recording a number of times each of the regenerator candidate sites are selected as a regenerator site while applying each of a set of data traffic conditions in the simulated network. The operations may also include statistically analyzing the number of times each of the regenerator candidate sites is selected to generate statistically analyzed information and presenting the statistically analyzed information.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4 illustrates a regenerator site selection ranking list that may be generated as part of an analysis of the optical network of FIG. 1;

DESCRIPTION OF EMBODIMENTS

Embodiments of the present invention will be explained with reference to the accompanying drawings.

Figure 1:
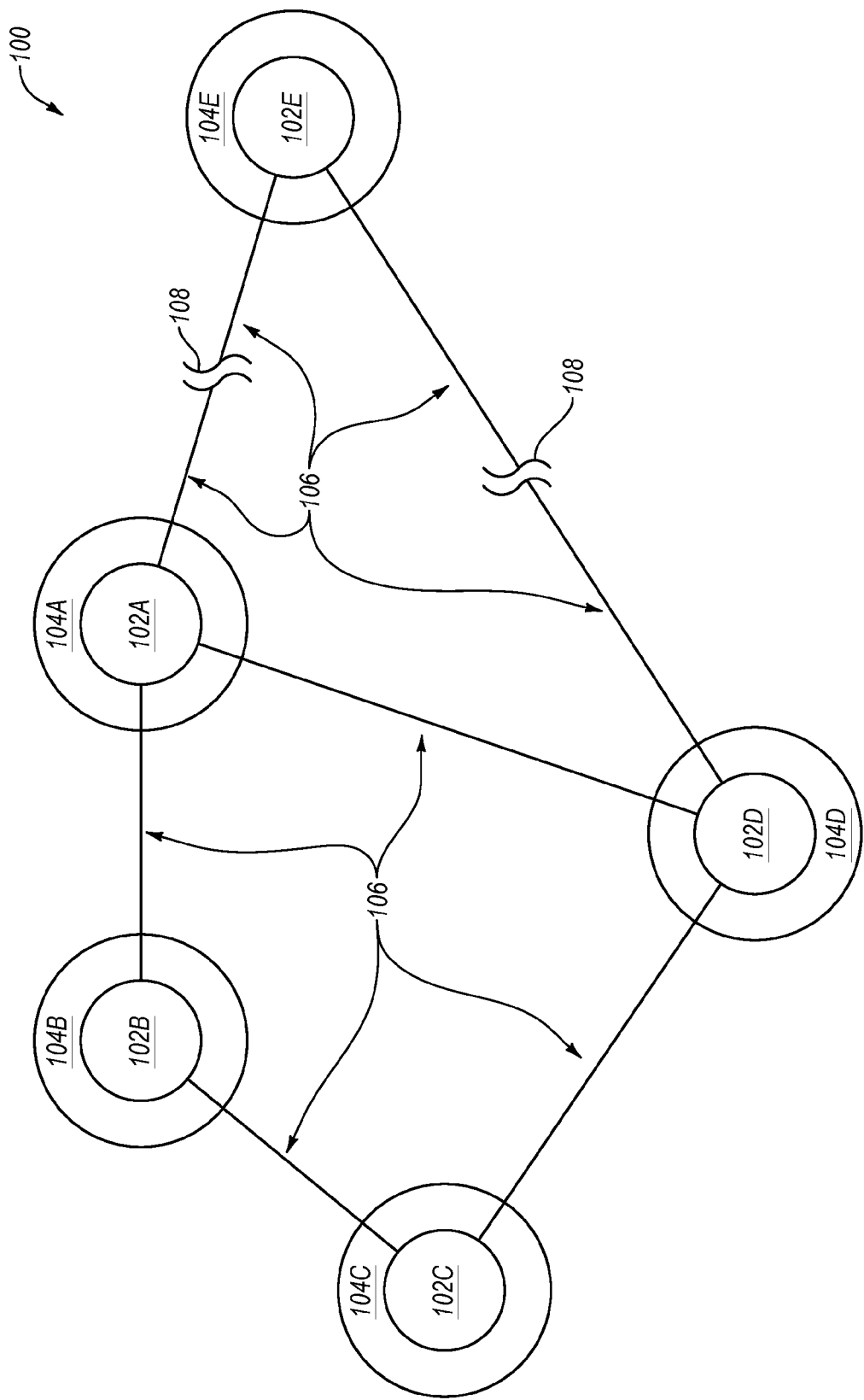
FIG. 1 is a block diagram of an example optical network in which some embodiments described herein may be implemented.

FIG. 1 is a block diagram of an example optical network 100 in which some embodiments described herein may be implemented. The optical network 100 depicted in FIG. 1 includes a backbone optical network. However, this depiction is not meant to be limiting. The optical network 100 may include a point-to-point optical network with terminal nodes, a ring optical network, a mesh optical network, any other suitable optical network, or a combination of two or more optical networks. Additionally, the optical network 100 may include a static network, a quasi-static network, or a dynamic network, for instance. In dynamic networks and quasi-static networks, data traffic loads of the optical network may change over time. Additionally still, the optical network 100 may include a planned optical network, which has not been built; an existing, functional optical network; or an existing, functional optical network with a planned expansion which has not yet been built.

The optical network 100 may communicate or may be configured to communicate optical signals between one or more nodes 102A-102E (generally, node 102 or nodes 102). The nodes 102 may include network elements performing complex functions in the optical network 100 such as network bridges, components of a computer cluster, etc. In FIG. 1, the optical network 100 may include a first node 102A, a second node 102B, a third node 102C, a fourth node 102D, and an Nth node 102E. The inclusion of the Nth node 102E is meant to represent that any desired number of nodes 102 may be included in the optical network 100 as circumstances warrant.

In some of the nodes 102, a regenerator may be installed. For example, the regenerator may be a primary or the only piece of equipment at one or more of the nodes 102 and/or may be installed in combination with other equipment at one or more of the nodes. However, installation of regenerators at every node 102 may be expensive and may not improve operation of the optical network 100. That is, installing regenerators at certain nodes 102 in the optical network 100 may substantially improve performance while installing regenerators at other nodes 102 may not substantially improve performance of the optical network 100.

Accordingly, an analysis of the optical network 100 may be performed to determine at which of the nodes 102 to install regenerators, among other things. More specifically, the analysis may be performed on a simulated network that models the optical network 100. Some additional details of example aspects of such an analysis are described below.

The nodes 102 may be located at regenerator candidate sites 104A-104E (generally, candidate site 104 or candidate sites 104). Specifically, the optical network 100 illustrated in FIG. 1 includes a first candidate site 104A, a second candidate site 104B, a third candidate site 104C, a fourth candidate site 104D, and an Nth candidate site 104E. The inclusion of the Nth candidate site 104E is meant to represent that any desired number of candidate sites 104 may be included in the optical network 100 as circumstances warrant.

Each of the candidate sites 104 generally includes a physical location, such as a city, at which one or more nodes 102 may be located. The candidate sites 104 refer to the physical locations that may be under consideration during the analysis of the optical network 100 discussed herein. Thus, in analyses including a simulated network, only the candidate sites 104 may be included in the simulated network. In the analysis of the optical network 100, the distinction between the node 102 at the candidate site 104 and simply the candidate site 104 essentially merge. For example, a result of an analysis may indicate that the first candidate site 104A is suitable as a regenerator site. This result may be interpreted as the first node 102A located at the first candidate site 104A is suitable as the regenerator site. Use of the candidate site 104 in the analysis of the optical network 100 enables some additional pragmatic considerations to be included in the analysis.

FIG. 1 depicts an embodiment of the optical network 100 in which all the physical locations are represented as candidate sites 104. However, in alternative embodiments the optical network 100 may include additional physical locations, which may or may not include nodes 102, which may not be candidate sites 104. For example, the optical network 100 may include a physical location not under consideration in the analysis discussed herein.

The nodes 102 may be communicatively coupled via one or more optical fibers 106. Between the nodes 102, the optical network 100 may include various network elements (not shown) that perform operations related to communication of optical signals in the optical network 100, for instance. In total, the optical network 100 includes five candidate sites 104 each of which includes one of the nodes 102. However, this is not meant to be limiting. Specifically in FIG. 1, two gaps 108 are included between the first candidate site 104A and the Nth candidate site 104E and between the fourth candidate site 104D and the Nth candidate site 102E. The two gaps 108 indicate that the optical network 100 may include additional optical fibers 106, nodes 102, candidate sites 104, etc. beyond those depicted in FIG. 1. In sum, the optical network 100 may include any number of nodes 102 and/or candidate sites 104. As a specific example, the optical network 100 may be implemented as a nation-wide backbone optical network having a certain number of candidate sites 104, such as 75 candidate sites 104, spanning across a country, such as the United States of America.

A simulated network (not shown) may be produced which is modeled on the optical network 100. The simulated network may include a computer-based simulation that substantially models operation of the optical network 100. Additionally, the simulated network may include simulated elements and/or simulated components of the optical network 100. For example, the simulated network modeled on the optical network 100 includes simulations of the nodes 102, the optical fibers 106, and the candidate sites 104 of the optical network 100. Probability-based analyses may be run on the simulated network to optimize or otherwise plan the optical network 100, for example. In some embodiments, the simulated network may be incorporated in and/or generated by an optical network analysis tool. The optical network analysis tool may perform probability-based analyses on the simulated network.

One aspect of the optical network 100 that may be analyzed in the simulated network may be regenerator site selection. For example, the regenerator site selection in the simulated network may be based on a probability analysis. Generally, a probability-based regenerator site selection may be conducted by running multiple demand sets at multiple data traffic conditions through the simulated network. By conducting the probability-based regenerator site selection, locations of regenerator sites may be optimized or otherwise planned, for instance. The results of the probability-based regenerator site selection may additionally be used in other applications, some details of which are described below.

Figure 2:
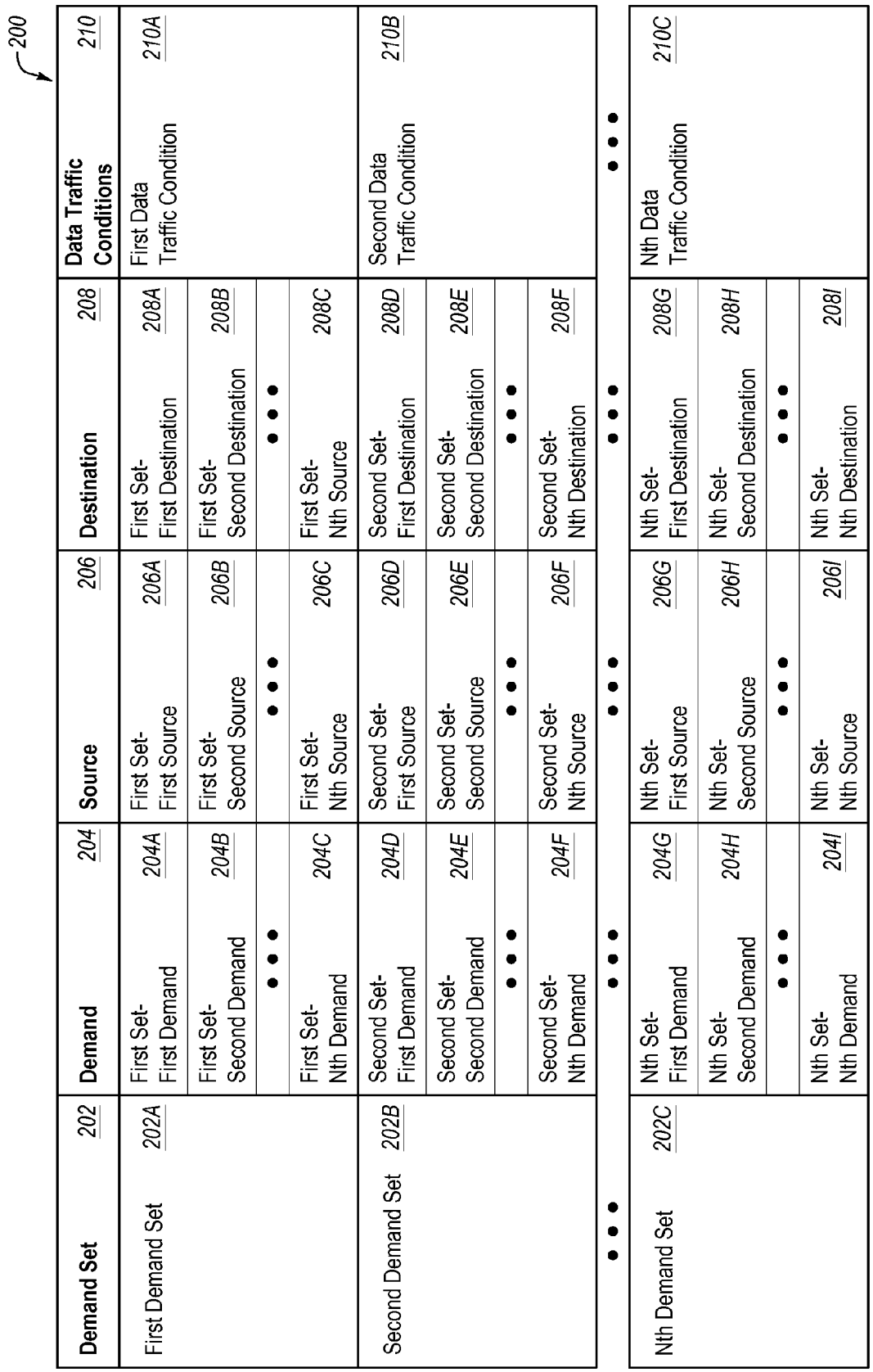
FIG. 2 illustrates a first table including example demand sets which may be generated for conducting analyses of the optical network of FIG. 1.

FIG. 2 illustrates a first table 200 including example demand sets 202 that may be generated for conducting analyses of the optical network 100 of FIG. 1. Each of the demand sets 202 may include one or more demands 204. Generally, each of the demands 204 includes a signal that is transmitted from a source 206 to a destination 208. Accordingly, the demands may be described as a source/destination pair. With combined reference to FIGS. 1 and 2, the analyses of the optical network 100 may include the introduction of the demands 204 into a simulated network modeled after the optical network 100. By introducing the demands 204 into the simulated network, it may be determined whether to involve a regenerator for each demand 204 and at which candidate site 104 to place the regenerator such that the signal may be transmitted to the destination 208 from the source 206.

Referring again to FIG. 2, included in the first table 200 are a first demand set 202A, a second demand set 202B, and an Nth demand set 202C, all representing instances of the demand sets 202. Inclusion of the ellipses and the Nth demand set 202C is meant to represent that there may be any desired number of demand sets 202. The demand sets 202 include demands 204. Specifically, in the first table 200, the demands 204 include a first demand 204A, a second demand 204B, and an Nth demand 204C in the first demand set 202A (in FIG. 2, first set-first demand 204A, first set-second demand 204B, first set-Nth demand 204C). Similarly, the second demand set 202B and the Nth demand set 202C include a first demand 204D, 204G, a second demand 204E, 204H, and an Nth demand 204F, 204I (in FIG. 2, second set-first demand 204D, second set-second demand 204E, second set-Nth demand 204F, Nth set-first demand 204G, Nth set-second demand 204H, Nth set-Nth demand 204I). Inclusion of the ellipses and the Nth demands 204C, 204F, and 204I are meant to represent that each demand set 202 may include any desired number of demands 204.

Each of the first demand set 202A, the second demand set 202B, and the Nth demand set 202C may differ, at least partially, from one another. That is, the first demand set 202A may include some subset of the demands 204 included in the second demand set 202B, but in total, the first demand set 202A may differ from the second demand set 202B. Additionally, the number of demands 204 in each of the demand sets 202 may differ. For example, the first demand set 202A may include a first number of demands 204, such as 100 demands, the second demand set 202B may include a second different number of demands 204, such as 80 demands, and the Nth demand set 202C may include a third different number of demands, such as 40 demands. Additionally, in some embodiments, which demands 204 are included in each of the demand sets 202 may be randomly or pseudo-randomly determined.

The demands 204 each include the source 206 and the destination 208, making up the source/destination pair. Specifically, each of the first demand set 202A, the second demand set 202B, and the Nth demand set 202C of the first demand set 202A includes a first, a second, and an Nth source and a first, a second, and an Nth destination. (in FIG. 2, first set-first source 206A, first set-second source 206B, first set-Nth source 206C, second set-first source 206D, second set-second source 206E, second set-Nth source 206F, Nth set-first source 206G, Nth set-second source 206H, Nth set-Nth source 206I, first set-first destination 208A, first set-second destination 208B, first set-Nth destination 208C, second set-first destination 208D, second set-second destination 208E, second set-Nth destination 208F, Nth set-first destination 208G, Nth set-second destination 208H, Nth set-Nth destination 208I).

The source 206 and/or the destination 208 may be a candidate site included in a simulated network. The candidate site included in the simulated network may implicitly include a node. With combined reference to FIGS. 1 and 2, the sources 206 and the destinations 208 may include the candidate sites 104 and/or the nodes 102 included at the candidate sites 104. For example, the first demand 204A of the first demand set 202A may include the first source 206A that corresponds to the fourth candidate site 104D. Likewise, the first destination 208A of the first demand set 202A may correspond to the third candidate site 104C. Thus, the first demand 204A may accordingly include the source/destination pair of the fourth candidate site 104D to the third candidate site 104C. In broader terms, the first demand 204A may include a signal transmitted from the fourth candidate site 104D to the third candidate site 104C.

The candidate sites 104 are not limited to being exclusively one of the sources 206 or one of the destinations 208. Instead, the candidate sites 104 may generally be sources 206 in some demands 204 and destinations 208 in other demands 204. For example, the candidate site 104 that may be the first source 206A of the first demand 204A may also be the second destination 208B of the second demand 204B, likewise the candidate site 104 that may be the first destination 208A in the first demand 204A may be the Nth source 206F of the second demand set 202B, etc.

The first table 200 additionally includes data traffic conditions 210 that may be generated for conducting analyses of the optical network 100 of FIG. 1. The data traffic conditions 210 may include a first data traffic condition 210A, a second data traffic condition 210B, and an Nth data traffic condition 210N. Each of the data traffic conditions 210 may include, for example, low level of data traffic, a moderate level of data traffic, a heavy level of data traffic, etc. The inclusion of the Nth data traffic condition 210C is meant to represent that any desired number of data traffic conditions 210 may be included in the first table 200.

Figure 3:
FIG. 3 illustrates a second table including example inputs and example results of an analysis that may be conducted on the optical network of FIG. 1.

FIG. 3 illustrates a second table 300 including example inputs 306 and example results 308 of an analysis that may be conducted on the optical network 100 of FIG. 1. In this and other embodiments, the analysis may be conducted by generating a simulated network that models a corresponding optical network, such as the optical network 100 in the present example. Included in the inputs 306 may be information or values introduced or applied during the analysis to the simulated network to produce or otherwise obtain the results 308. In the second table 300, the inputs 306 include the data traffic conditions 210 of the first table 200 of FIG. 2 and the demand sets 202 of the first table 200 of FIG. 2. As depicted in the second table 300, the first demand set 202A, the second demand set 202B, and the Nth demand set 202C repeat for each of the data traffic conditions 210. This is meant to represent that during the analysis, each of the demand sets 202 may be introduced to the simulated network while each data traffic condition 210 is applied in the simulated network.

The second table 300 also includes a column labeled "Candidate Sites 302" listing the candidate sites 302 included in the simulated network. For example, with combined reference to FIGS. 1 and 3, the simulated network may model the optical network 100. Accordingly, the candidate sites 302 listed in the column labeled "Candidate Sites 302" may include the candidate sites 104 of FIG. 1. Referring again to FIG. 3, similar to the demand sets 202, the candidate sites 302 repeat for each data traffic condition 210.

A last column labeled "Number of Times Selected 304" includes constants 304A-304I that indicate a number of times each of the candidate sites 302 is selected as a regenerator site during the analysis. For example, a first constant 304A corresponds to the number of times the first candidate site 302A is selected when the first demand set 202A is introduced to the simulated network while the first data traffic condition 210A is applied.

With combined reference to FIGS. 2 and 3, in some analyses, each of the data traffic conditions 210 may be applied in the simulated network. While each of the data traffic conditions 210 is applied, the demand sets 202 may then be introduced to the simulated network. As discussed above, each of the demand sets 202 include the demands 204. The demands 204 include a signal that is transmitted from the source 206 to the destination 208 of each source/destination pair. If the destination 208 of the demand 204 is reachable from the source 206, then no regenerator site is selected. If however, the destination 208 of the demand 204 may not be reached, the regenerator site may be selected from one of the candidate sites 302 between the source 206 and the destination 208.

For example, with combined reference to FIGS. 1-3, the second data traffic condition 210B, which may include a moderate level of data traffic; may be applied in the simulated network and the second demand set 202B may be introduced to the simulated network. The second demand set 202B includes the first demand 204D, which may include the third candidate site 104C as the source 206D and the first candidate site 104A as the destination 208D. When the first demand 204D is introduced to the simulated network the second candidate site 104B or the fourth candidate site 104D may be selected as a regenerator site to regenerate the signal en route from the third candidate site 104C to the first candidate site 104A. In some embodiments, the regenerator site may be selected through a regenerator assignment algorithm, for example.

In a similar fashion, each of the demands 204 of each of the demand sets 202 are introduced to the simulated network at each of the data traffic conditions 210. At each of the demand sets 202 the number of times each candidate site 302 is selected as the regenerator site is recorded in the column labeled "Number Of Times Selected 304."

The number of times each of the candidate sites is selected as a regenerator site may be statistically analyzed. For example, for each of the candidate sites 302, a probability value, a probability expectation, a probability standard deviation, a standard deviation-weighted probability expectation (SDPE), or some combination thereof may be calculated based on a number of times each of the candidate sites is selected as a regenerator site.

The probability value of each of the candidate sites 302 may be described by the following example equation:

$$p_i = \frac{\text{number\_of\_times\_selected}}{\text{total\_demands\_under\_traffic\_condition}}$$

In the foregoing equations, $p_i$ represents the probability value of one of the candidate sites 302 at one of the data traffic conditions 210. The value of i is incrementally changed to include a whole integer corresponding to the data traffic condition 210. For example, the first data traffic condition 210A may be represented by i having the value of 1. Additionally, the second data traffic condition 210B may be represented by i having the value of 2. Accordingly, $p_1$ represents the probability value of one of the candidate sites 302 at the first data traffic condition 210A and $p_2$ represents the probability value of one of the candidate sites 302 at the second data traffic condition 210B. The "number_of_times_selected" represents one of the constants 304 indicating the number of times the candidate site 302 was selected as the regenerator site at the data traffic condition 210. The "total_demands_under_ traffic_condition" represents a total or aggregate number of demands in all the demand sets 202 introduced to the simulated network at the data traffic condition 210. For example, there may be three demand sets 202A-202C respectively having a first number of demands, a second number of demands, and a third number of demands. In an example embodiment, the first, second, and third number of demands may be 100, 100, and 150, respectively. Accordingly, in this specific example, the total_demands_under_traffic_condition is equal to 350, although the total_demands_under_traffic_ condition may be different in other embodiments depending on the number of demand sets and the number of demands in each demand set.

Additionally or alternatively, the probability expectation of each of the candidate sites 302 may be described by the following example equation:

$$\mu = \frac{\sum_{i=1}^{n} p_i}{n}$$

In the foregoing equation, $\mu$ represents the probability expectation of each of the candidate sites 302. Additionally, $p_i$ represents the probability value of one of the candidate sites 302 at one of the data traffic conditions 210 as discussed above. Additionally, the n represents a total or aggregate number of the data traffic conditions 210. The $\Sigma$ represents a summation of each of the probability values $p_i$ from all the data traffic conditions 210.

The probability standard deviation of each of the candidate sites 302 may be described by the following example equation:

$$\sigma = \sqrt{\frac{\sum_{i=1}^{n}(p_i - \mu)^2}{n}}$$

In the foregoing equation, $\sigma$ represents the probability standard deviation. The other variables included in the foregoing equation are described above.

The SDPE of each of the candidate sites 302 may be described by the following example equation:

$$SDPE = (1-\sigma) \times \mu$$

In the foregoing equation, SDPE represents the SDPE. The other variables, $\mu$ and $\sigma$, included in the foregoing equation are described above. The foregoing equation for SDPE is only one parameter that may be derived from the number of times each of the candidate sites 302 is selected and that may be used in selecting a regenerator site. In alternative embodiments, another parameter may be calculated that may be used in selecting a regenerator site. The parameter may weight the probability expectation $\mu$ rather than standard deviation, for instance.

The statistical analyses may be used in a variety of ways. In some embodiments, the statistical analyses may be used to select a regenerator site in an optical network. For example, at least partially based on the SDPE, one or more of the candidate sites 302 may be selected as regenerator sites for the optical network. Some additional details of selecting a regenerator site in the optical network are provided below. Additionally or alternatively, the statistical analyses may be used to evaluate selection algorithms that generate a list of regenerator sites through other methods.

The tables 200 and 300 are provided by way of example only and are not meant to be limiting to embodiments of the analyses or to tools performing the analyses. Indeed, in some embodiments, the analyses may not receive input from the tables 200 or 300, as illustrated herein, may not receive input from tables at all, may not generate the tables 200 or 300 as illustrated herein, or may not generate tables at all.

FIG. 4 illustrates a regenerator site selection ranking list (ranking list) 400 that may be generated as part of an analysis of the optical network 100 of FIG. 1. Generally, the ranking list 400 may organize results of the analysis conducted on the optical network 100. The ranking list 400 may include candidate sites 302. The candidate sites 302 correspond to the candidate sites 302 of FIG. 3. The ranking list 400 may also include SDPE values 402 for each of the candidate sites 302. Generally, the SDPE value 402 may be a value between 0 and 1. The SDPE value 402 may provide an indication of the number of times the candidate site 302 was selected during the analysis. In some embodiments, an SDPE value 402 closer to 1 may indicate that the candidate site 302 was selected as a regenerator site with relatively greater regularity during the analysis than another candidate site 302 with an SDPE value 402 closer to 0.

In alternative embodiments, instead of or in addition to calculating the SDPE, the analysis may calculate one or more other statistical values for the candidate sites 302. Accordingly, the ranking list 400 may include the other statistical values.

The ranking list 400 may also include a column labeled "SDPE Ranking 404" in which the candidate sites 302 may be ranked according to the SDPE value 402. The column labeled "SDPE Ranking 404 may include a value indicating the order in which the candidate sites 302 rank according to SDPE value 402. For example, if a first SDPE 402A is greater than the second SDPE 402B through the Nth SDPE 402C, then a first SDPE ranking 404A may include the term "first."

In some embodiments, a threshold may be determined with regard to the SDPE value 402 of the candidate sites 302. The threshold may be a value, above which the SDPE value 402 of a candidate site 302 is high enough to justify construction of a regenerator site, for instance. In some embodiments, the threshold may be 0.35, or some other value.

For example, in an optical network such as the optical network 100 of FIG. 1, a planner may install a regenerator in only the candidate sites 302 in which the SDPE value 402 is above the example threshold of 0.35. The SDPE value 402 above 0.35 or other threshold indicates that the candidate site 302 is being selected above a certain number or percentage of times during analyses in the simulated network. Additionally, the threshold may eliminate certain candidate sites 302 from consideration. For example, when the SDPE value 402 is below a threshold, the number or the percentage of times the candidate site 302 is selected may be too low to justify construction of a regenerator at the candidate site 302.

Additionally or alternatively, the ranking list 400 may enable modification of values in the ranking list 400 to account for pragmatic considerations. In some embodiments, a user may input pragmatic considerations such as availability of utilities, favorable taxes, existence facilities, etc. The pragmatic considerations may modify the SDPE value 402 of the corresponding candidate sites 302. The candidate sites 302 may then be re-ranked based on the SDPE value 402 calculated from the number of times the candidate site 302 was selected as well as the pragmatic conditions.

Figure 5:
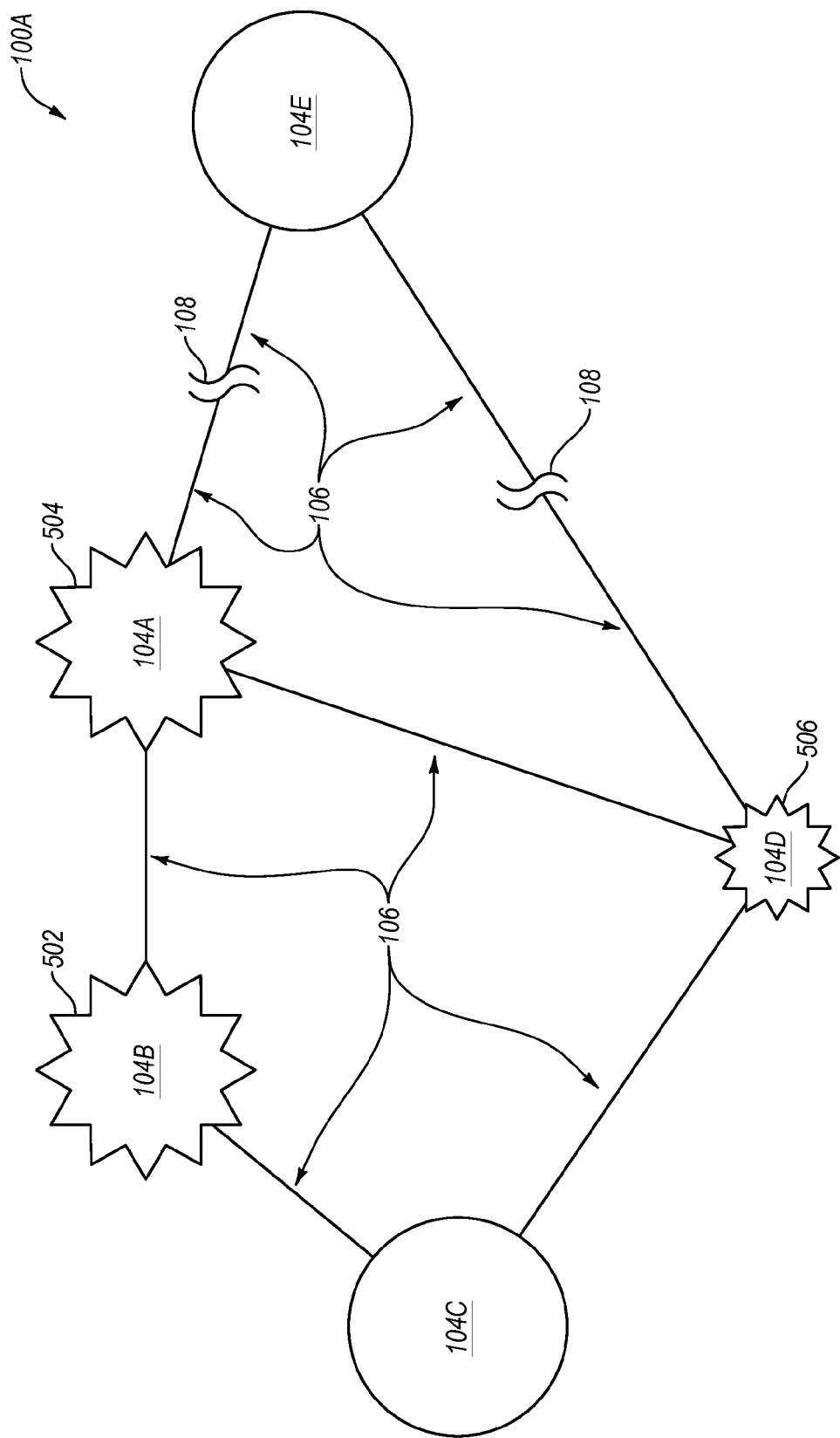
FIG. 5 illustrates an example plot of a simulated network modeled on the optical network of FIG. 1.

Additionally or alternatively, the statistically analyzed information may be presented. For example, FIG. 5 illustrates an example plot 100A of a simulated network modeled on the optical network 100 of FIG. 1. In the plot 100A of FIG. 5, the candidate sites 104A-104E correspond to the candidate sites 104 of FIG. 1. In the plot 100A, the first candidate site 104A, the second candidate site 104B, and the fourth candidate site 104D have been identified as candidate sites 104 having a SDPE value above a threshold. To highlight that the first candidate site 104A, the second candidate site 104B, and the fourth candidate site 104D include the SDPE value above the threshold, stars 502, 504, and 506 surround them. Additionally, sizes of the stars 502, 504, and 506 may indicate a relative SDPE value. In the plot 100A two of the stars 502 and 504 are larger than a third star 506 indicating that the SDPE value of the first candidate site 104A and the second candidate site 104B is greater than the SDPE value of the fourth candidate site 104D, for instance.

Use of stars 502, 504, and 506 is not meant to be limiting. In alternative embodiments, any other visual representation of some subset of statistically analyzed information may be included in the plot 100A. For example, the plot 100A may include a variety of colors, sizes, shapes, or other characteristics to convey relative values.

Additionally or alternatively, a site probability map may be generated. The site probability map may look substantially the same as the plot 100A in FIG. 5. However, the site probability map may include visual representations of the probability standard deviations of the candidate sites 104, for example. The site probability map may visually represent the probability that a candidate site 104 is selected as a regenerator site.

Additionally, multiple analyses may be conducted as discussed above using different numbers of demands, traffic conditions, different demands, or some combination thereof. The probability standard deviations of the candidate sites 104 from each of the analyses may be merged to compare the results of the analyses and/or increase robustness of the analyses. In some embodiments, the analyses may be merged in a site probability map.

Figure 6:
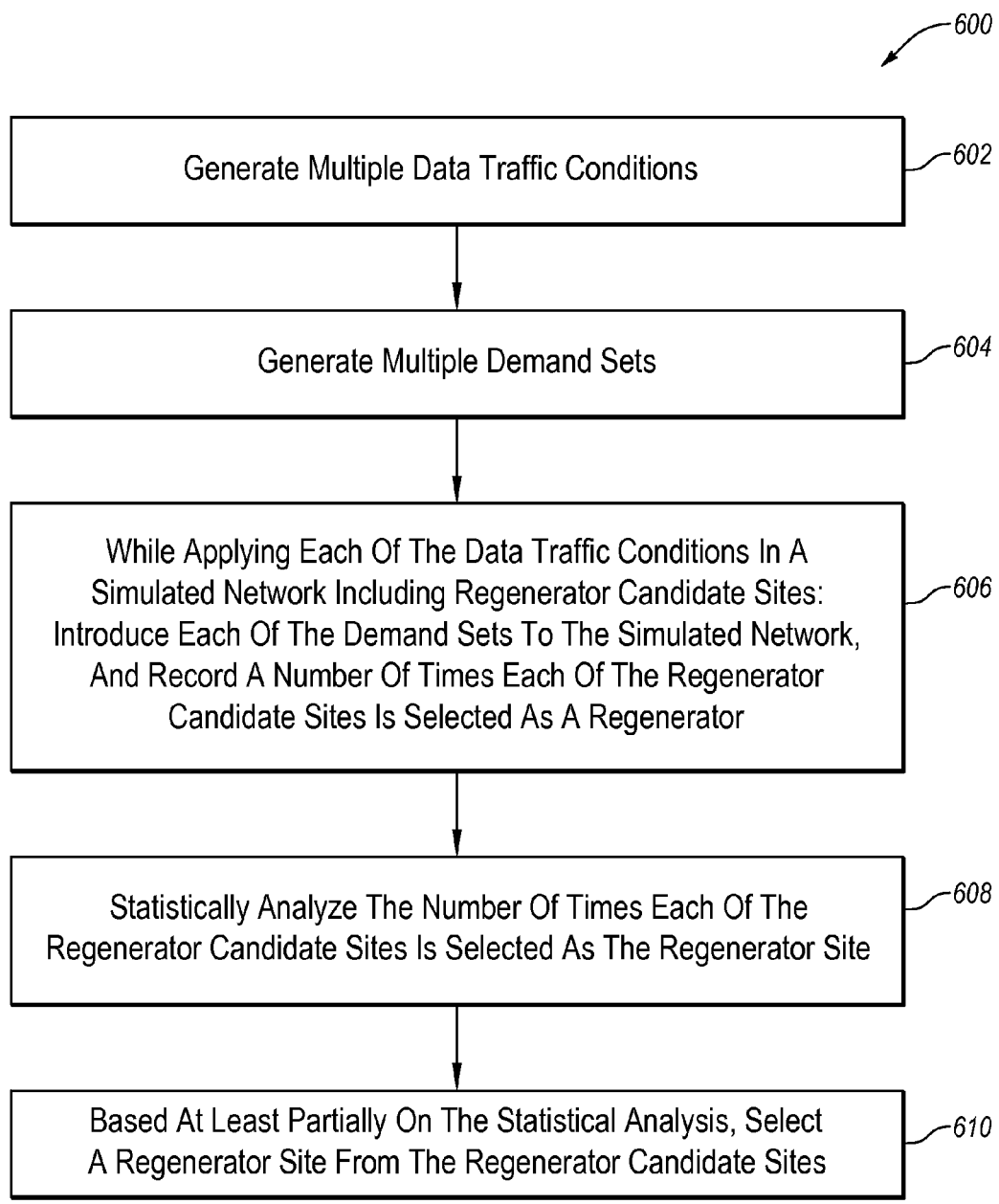
FIG. 6 is a flow diagram of an example method of probability analysis-based regenerator site selection.

FIG. 6 is a flow diagram of an example method 600 of probability analysis-based regenerator site selection. The method 600 may be implemented by an optical analysis tool or a computing device 800 discussed below, in some embodiments. The method 600 includes various operations, functions, or actions as illustrated by one or more of blocks 602, 604, 606, 608, and/or 610. The method 600 may begin at block 602.

At block 602 ("Generate Multiple Data Traffic Conditions"), multiple data traffic conditions may be generated. The data traffic conditions may include various levels of data traffic including, but not limited to, a low level of data traffic, a moderate level of data traffic, a heavy level of data traffic, etc.

At block 604 ("Generate Multiple Demand Sets"), multiple demand sets may be generated. In some embodiments, the number of demand sets may include about 10,000 demand sets. Additionally, the number of demands included in at least two of the demand sets may vary.

At block 606 (While Applying Each Of The Data Traffic Conditions In A Simulated Network Including Regenerator Candidate Sites: Introduce Each Of The Demand Sets To The Simulated Network, And Record A Number Of Times Each Of The Regenerator Candidate Sites Is Selected As A Regenerator Site"), each of the data traffic conditions may be applied in the simulated network. The simulated network includes regenerator candidate sites. While applying each of the data traffic conditions in the simulated network, each of the demand sets may be introduced to the simulated network. Additionally, a number of times each of the regenerator candidate sites is selected as a regenerator site may be recorded. In some embodiments, the simulated network may model a dynamic network or quasi-static network.

At block 608 ("Statistically Analyze The Number Of Times Each Of The Regenerator Candidate Sites Is Selected As The Regenerator Site"), the number of times each of the regenerator candidate sites is selected may be statistically analyzed. The statistical analysis may include calculating a SDPE value, a probability value, a probability expectation value, a probability standard deviation, or some combination thereof for each regenerator candidate site.

At block 610 ("Based At Least Partially On The Statistical Analysis, Select A Regenerator Site From The Regenerator Candidate Sites"), a regenerator site may be selected from the regenerator candidate sites based at least partially on the statistical analysis.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

For example, in some embodiments, the method 600 may additionally include ranking the regenerator candidate sites according to the SDPE values. A threshold may be determined. The threshold may include a SDPE value above which a regenerator site may be economically viable, for instance. In these and other embodiments, selecting a regenerator site based at least partially on the statistical analysis at block 610 may include selecting a regenerator site that includes a SDPE value above the threshold.

Additionally or alternatively, a ranking list may be generated. In the ranking list, the regenerator candidate sites may be ranked based on the SDPE values. Additionally, the ranking list may enable modification of the SDPE values based on a pragmatic consideration. In some embodiments, the regenerator candidate sites may be plotted according to the SDPE values.

Figure 7:
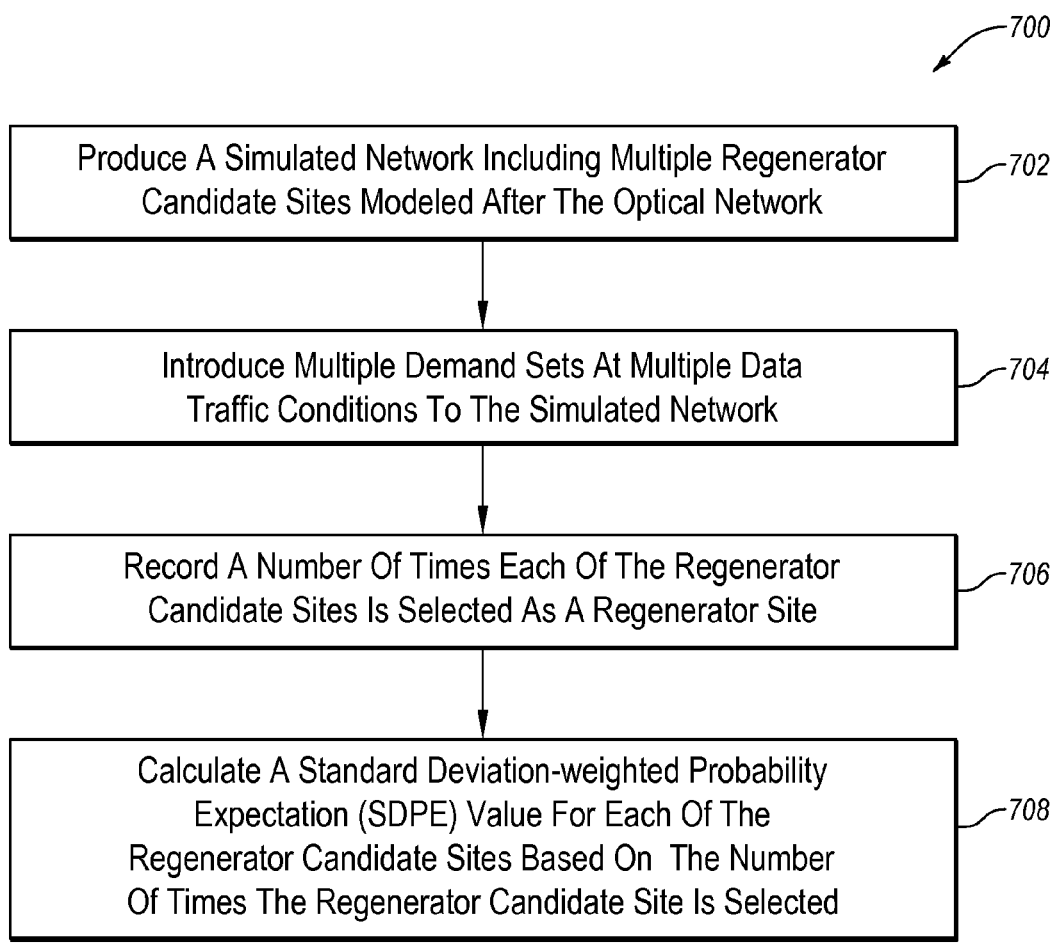
FIG. 7 is a flow diagram of an example method of evaluating regenerator sites of an optical network under unpredictable data traffic conditions.

FIG. 7 is a flow diagram of an example method 700 of evaluating regenerator sites of an optical network under unpredictable data traffic conditions, arranged in accordance with at least some embodiments described herein. The method 700 may be implemented by an optical analysis tool or a computing device 800 discussed below, in some embodiments. The method 700 includes various operations, functions, or actions as illustrated by one or more of blocks 702, 704, 706, and/or 708. The method 700 may begin at block 702.

In block 702, ("Produce A Simulated Network Including Multiple Regenerator Candidate Sites Modeled After The Optical Network"), a simulated network may be produced. The simulated network may include multiple regenerator candidate sites. The simulated network may be modeled after the optical network.

In block 704 ("Introduce Multiple Demand Sets At Multiple Data Traffic Conditions To The Simulated Network"), multiple demand sets may be introduced to the simulated network. The multiple demand sets may be introduced at multiple data traffic conditions.

In block 706 ("Record A Number Of Times Each Of The Regenerator Candidate Sites Is Selected As A Regenerator Site"), a number of times each of the regenerator candidate sites is selected as a regenerator may be recorded.

In block 708 ("Calculate A Standard Deviation-Weighted Probability Expectation (SDPE) Value For Each Of The Regenerator Candidate Sites Based On The Number Of Times The Regenerator Candidate Site Is Selected"), a SDPE value may be calculated. In some embodiments, the SDPE value may be calculated for each of the regenerator candidate sites. The SDPE may be based on the number of time the regenerator candidate sites is selected.

Additionally in some embodiments, the regenerator candidate sites may be ranked according to the SDPE values. A regenerator candidate site may be selected as a regenerator site in the optical network In some embodiments, a probability value of the regenerator candidate site may be calculated. For example, the probability value may be calculated as the number of times the regenerator candidate site is selected divided by a number of demand sets included in the multiple demands. Additionally, a probability expectation may be calculated. For example, the probability expectation may be calculated as a sum of the probability values for each of the data traffic conditions divided by a number of data traffic conditions included in the multiple data traffic conditions. Additionally, in some embodiments, a probability standard deviation may be calculated. The probability standard deviation may be calculated for each regenerator candidate site based on the number of times the regenerator candidate site is selected. A site probability map may be generated depicting the probability standard deviations for each of the regenerator candidate sites. The site probability map may visually depict the likelihood that a regenerator site may be selected as a regenerator site.

In some embodiment, another set of demand sets may be introduced to the simulated network at another set of data traffic conditions. A second site probability map may be generated and merged with the site probability map.

Additionally or alternatively, in some embodiments, a list of selected regenerator sites of the optical network may be received. A selection algorithm may generate the list of selected regenerator sites. The list of selected regenerator sites may be compared with the SDPE to evaluate the selection algorithm.

Figure 8:
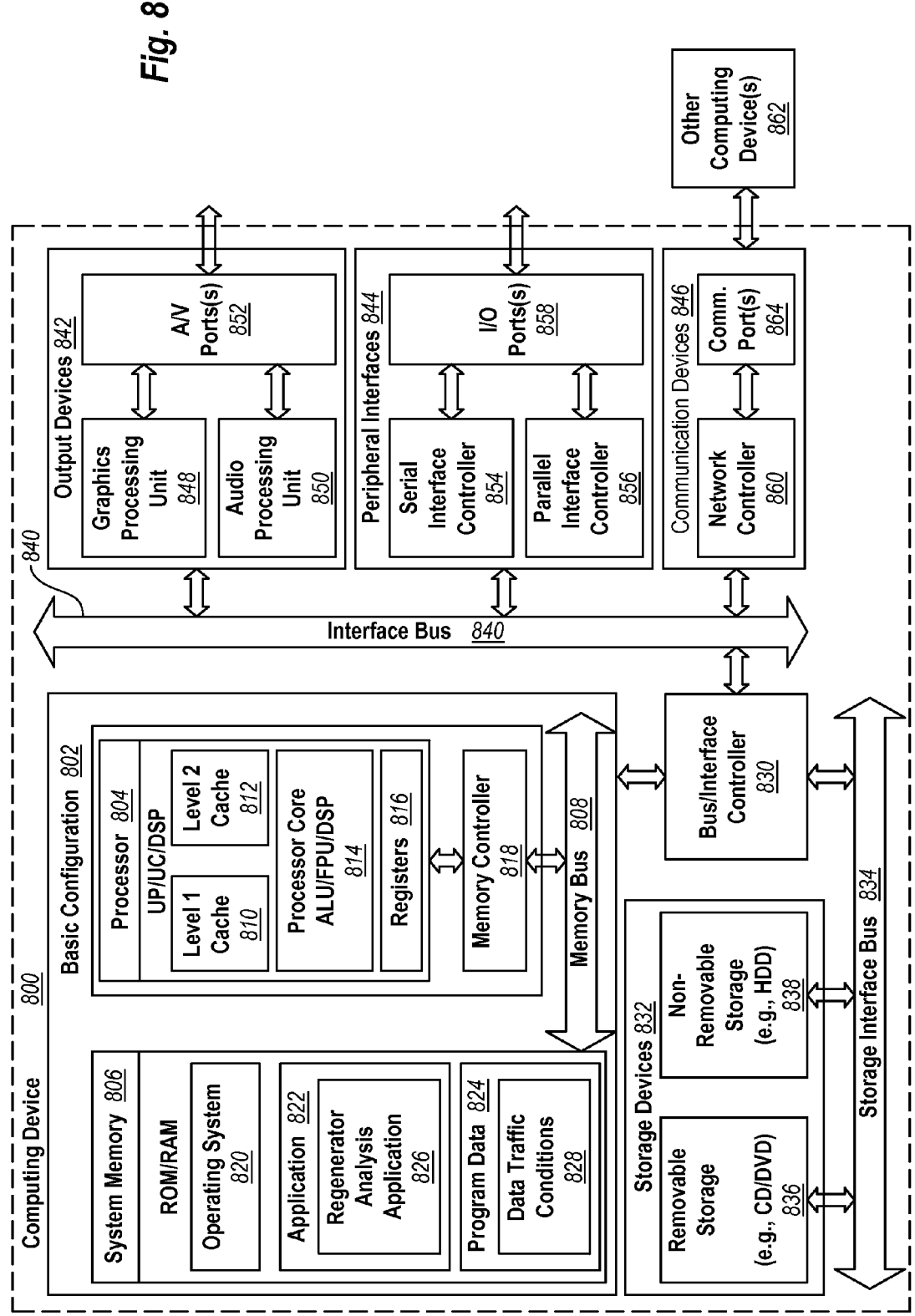
FIG. 8 is a block diagram illustrating an example computing device that is arranged for analysis of optical networks, in accordance with at least some embodiments described herein.

FIG. 8 is a block diagram illustrating an example computing device 800 that is arranged for analysis of optical networks, such as the optical network 100 of FIG. 1, in accordance with the present disclosure. In a basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include a regenerator analysis application 826 that is arranged to provide optical network analysis. Program data 824 may include data traffic conditions and/or demand sets 828 ("data traffic conditions" in FIG. 8) that may be useful for optical network analysis described herein. In some embodiments, application 822 may be arranged to operate with program data 824 on operating system 820 such that optical network analysis may be performed on the computing device 800. This described basic configuration 802 is illustrated in FIG. 8 by those components within the boxed area.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836, and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present invention may be carried out in other specific ways than those herein set forth without departing from the scope. The present embodiments are, therefore, to be considered in all respects as illustrative and not restrictive, and all changes coming within the meaning and equivalency range of the appended claims are intended to be embraced therein.

What is claimed is:

1. A method of probability analysis-based regenerator site selection comprising:
   generating, by one or more processors, a plurality of data traffic conditions;
   generating, by the one or more processors, a plurality of demand sets;
   while applying each of the data traffic conditions in a simulated network including regenerator candidate sites:
      introducing, by the one or more processors, each of the demand sets to the simulated network, and
      recording, in one or more non-transitory computer readable mediums, a number of times each of the regenerator candidate sites is selected as a regenerator site;
   statistically analyzing, by the one or more processors, the number of times each of the regenerator candidate sites is selected as the regenerator site, wherein the statistically analyzing includes calculating, by the one or more processors, a standard deviation-weighted probability expectation (SDPE) value for one or more of the regenerator candidate sites; and
   based at least partially on the statistical analysis, selecting, by the one or more processors, a regenerator site from the regenerator candidate sites.

2. The method of claim 1, further comprising:
   ranking, by the one or more processors, the regenerator candidate sites according to the SDPE values; and
   determining, by the one or more processors, a threshold, wherein selecting a regenerator site includes selecting a regenerator candidate site with an SDPE value above the threshold.

3. The method of claim 1, further comprising generating, by the one or more processors, a regenerator site selection ranking list, wherein the regenerator candidate sites are ranked based on the SDPE values.

4. The method of claim 3, further comprising plotting, by the one or more processors, the regenerator candidate sites according to the SDPE values.

5. The method of claim 3, wherein the regenerator site selection ranking list enables modification of the SDPE values based on a pragmatic consideration.

6. The method of claim 1, wherein the simulated network models a dynamic network or a quasi-static network.

7. The method of claim 1, wherein the plurality of demand sets includes about 10,000 demand sets.

8. The method of claim 1, wherein a number of demands included in one of the demand sets is different from a number of demands included in another of the demand sets.

9. The method of claim 1, further comprising:
   calculating, by the one or more processors, a probability value for one or more of the regenerator candidate sites under each of the data traffic conditions;
   calculating, by the one or more processors, a probability expectation value for each of the regenerator candidate sites; and
   calculating, by the one or more processors, a probability standard deviation for each of the regenerator candidate sites.

10. A non-transitory computer-readable storage medium having computer-readable instructions stored thereon that are executable by a computing device to perform the method of claim 1.

11. A method of evaluating regenerator sites of an optical network under unpredictable data traffic conditions, the method comprising:
   producing, by one or more processors, a simulated network including a plurality of regenerator candidate sites modeled after the optical network;
   introducing, by the one or more processors, a plurality of demand sets at a plurality of data traffic conditions to the simulated network;
   recording, in one or more non-transitory computer readable mediums, a number of times each of the regenerator candidate sites is selected as a regenerator site; and
   calculating, by the one or more processors, a standard deviation-weighted probability expectation (SDPE) value for each of the regenerator candidate sites based on the number of times the regenerator candidate site is selected.

12. The method of claim 11, further comprising:
   ranking, by the one or more processors, the plurality of regenerator candidate sites according to the SDPE values; and
   selecting, by the one or more processors, a regenerator candidate site as a regenerator site in the optical network.

13. The method of claim 12, wherein calculating the SDPE values comprises:
calculating, by the one or more processors, a probability value of a regenerator candidate site as the number of times the regenerator candidate site is selected divided by a number of demand sets included in the plurality of demands;
calculating, by the one or more processors, a probability expectation as a sum of the probability values for each of the data traffic conditions divided by a number of data traffic conditions included in the plurality of data traffic conditions;
calculating, by the one or more processors, a probability standard deviation; and
multiplying, by the one or more processors, the probability expectation by 1 minus the probability standard deviation.

14. The method of claim 11, further comprising:
calculating, by the one or more processors, a probability standard deviation for each regenerator candidate site based on the number of times the regenerator candidate site is selected; and
generating, by the one or more processors, a site probability map depicting the probability standard deviations for each of the regenerator candidate sites.

15. The method claim 14, further comprising:
for each of the regenerator candidate sites included in the simulated network, calculating, by the one or more processors, a probability standard deviation based on the number of times the regenerator candidate site is selected as a regenerator site during an introduction of a second plurality of demand sets at a second plurality of data traffic conditions to the simulated network;
generating, by the one or more processors, a second site probability map; and
merging, by the one or more processors, the site probability map with the second site probability map.

16. The method of claim 11, further comprising:
receiving, by the one or more processors, a list of selected regenerator sites of the optical network, wherein a selection algorithm generates the list of selected regenerator sites; and
comparing, by the one or more processors, the list of selected regenerator sites with the weighted probability expectations to evaluate the selection algorithm.

17. An optical network analysis tool comprising a non-transitory computer-readable storage medium having computer-readable instructions stored thereon that are executable by a computing device to perform operations comprising:
generating, by one or more processors, a simulated network that models an optical network including regenerator candidate sites;
while applying each data traffic condition of a plurality of data traffic conditions in the simulated network, conducting, by the one or more processors, an analysis of the optical network including:
introducing, by the one or more processors, a plurality of signals transmitted between a plurality of source/destination pairs, and
recording, by the one or more processors, a number of times each of the regenerator candidate sites is selected as a regenerator site;
statistically analyzing, by the one or more processors, the number of times each of the regenerator candidate sites is selected to generate statistically analyzed information, wherein the statistical analyzing includes calculating, by the one or more processors, a standard deviation-weighted probability expectation (SDPE) value for each regenerator candidate site; and
presenting, by the one or more processors, the statistically analyzed information.

18. The optical network analysis tool of claim 17, wherein the statistically analyzed information is presented in a regenerator site selection ranking list.

* * * * *